United States Patent
Buchali et al.

(10) Patent No.: US 8,867,916 B2
(45) Date of Patent: Oct. 21, 2014

(54) OPTICAL TRANSMISSION METHOD AND APPARATUS USING OFDM

(75) Inventors: Fred Buchali, Waiblingen (DE); Roman Dischler, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 63 days.

(21) Appl. No.: 13/499,409

(22) PCT Filed: Oct. 6, 2010

(86) PCT No.: PCT/EP2010/064915
§ 371 (c)(1),
(2), (4) Date: Mar. 30, 2012

(87) PCT Pub. No.: WO2011/045217
PCT Pub. Date: Apr. 21, 2011

(65) Prior Publication Data
US 2012/0189311 A1 Jul. 26, 2012

(30) Foreign Application Priority Data
Oct. 13, 2009 (EP) .................................... 09305974

(51) Int. Cl.
*H04J 14/00* (2006.01)
*H04J 14/02* (2006.01)
*H04B 10/548* (2013.01)
*H04L 27/00* (2006.01)

(52) U.S. Cl.
CPC ........... *H04J 14/021* (2013.01); *H04J 14/0204* (2013.01); *H04J 14/02* (2013.01); *H04J 14/0213* (2013.01); *H04J 14/0205* (2013.01); *H04B 10/548* (2013.01); *H04L 27/0008* (2013.01); *H04J 14/0206* (2013.01)
USPC .................... 398/79; 398/43; 398/68; 398/83; 398/85

(58) Field of Classification Search
CPC ... H04J 14/02; H04J 14/0204; H04J 14/0206; H04J 14/021; H04J 14/0213

USPC ...................................... 398/79, 83, 85, 43, 68
See application file for complete search history.

(56) References Cited

U.S. PATENT DOCUMENTS

| | | | | |
|---|---|---|---|---|
| 6,493,117 | B1 * | 12/2002 | Milton et al. | 398/49 |
| 6,996,307 | B2 | 2/2006 | Chandrasekhar et al. | |
| 2002/0191249 | A1 * | 12/2002 | Orbach et al. | 359/127 |
| 2004/0008401 | A1 | 1/2004 | Szczepanek et al. | |
| 2008/0281207 | A1 * | 11/2008 | Johnston | 600/476 |
| 2009/0092393 | A1 * | 4/2009 | Xu et al. | 398/79 |
| 2009/0190929 | A1 * | 7/2009 | Khurgin et al. | 398/79 |
| 2009/0196602 | A1 * | 8/2009 | Saunders et al. | 398/26 |

FOREIGN PATENT DOCUMENTS

| | | |
|---|---|---|
| GB | 2286097 | 8/1995 |
| WO | 2009100252 | 8/2009 |

OTHER PUBLICATIONS

Dischler, Roman et al; Interleaving OFDM signals for multiple access with optical routing capability and high spectral efficiency; Optical Communication; 2009; ECOC '09; 35th European Conference on, IEEE, Piscataway, NJ; USA; Sep. 20, 2009; pp. 1-2; XP031546439; ISBN: 978-1-4244-5096-1.

Yan Tang et al; Coherent Optical OFDM Transmission Up to 1 Tb/s per Channel; Journal of Lightwave Technology IEEE Service Center; New York, NY; USA; vol. PP, No. 16; Aug. 15, 2009; pp. 3511-3517; XP011262208; ISSN: 0733-8724.

Dischler, Roman et al; Transmission of 1.2 Tb/s Continuous Waveband PDM-OFDM-FDM signal with Spectral Efficiency of 3.3 bit/s/Hz over 400 km of SSMF; Optical Fiber Communication—Includes Post Deadline Papers; 2009; OFC 2009; Conference on, IEEE, Piscataway, NJ, USA; Mar. 22, 2009; pp. 1-3; XP031468143; ISBN: 978-1-4244-2606-5.

M. Jinno, et al; Demonstration of Novel Spectrum-Efficient Elastic Optical Path Network with Per-Channel Variable Capacity of 40 Gb/s to Over 400Gb/s; ECOC 2008, Sep. 21-25, 2008, Brussels, Belgium; vol. 7-19; Th.3 F.6.

\* cited by examiner

*Primary Examiner* — David Payne
*Assistant Examiner* — Pranesh Barua

(74) *Attorney, Agent, or Firm* — Carmen Patti Law Group, LLC

(57) ABSTRACT

In order to achieve a higher spectral efficiency of OFDM sub-bands, optical signals using orthogonal frequency division multiplexing are transmitted through an optical network in the form of a continuous waveband optical signal. An optical add/drop multiplexer (1) splits the continuous waveband optical signal into an express path and a drop path. A band pass filter (4) is provided in the drop path to extract a sub-band carrying at least one of said OFDM modulated optical signals (DROP). The band pass filter (4) has a filter bandwidth that covers the sub-band to be extracted. A band-stop filter (3) is provided in the express path to remove the sub-band to be extracted from the continuous waveband optical signal (IN). The band stop filter (3) has a filter bandwidth which is narrower than the band pass filter (4). An OFDM modulated optical add signal (ADD) can be added into the wavelength gap created through the band stop filter (3). The sub-band carrying the optical add signal (ADD) occupies a wavelength range which is completely covered by the filter bandwidth of the band-stop filter (3). The difference between the filter bandwidths of the band pass filter (4) and the band stop filter (3) corresponds preferably to the slope of the filter edges of the filters (3, 4).

12 Claims, 4 Drawing Sheets

OPTICAL TRANSMISSION METHOD AND APPARATUS USING OFDM

FIELD OF THE INVENTION

The present invention relates to the field of telecommunications and more particularly to a method and related apparatus for optical signal transmission using orthogonal frequency division multiplexing.

BACKGROUND OF THE INVENTION

Today, optical transmission system rely widely on wavelength division multiplexing, where individual wavelength channels are arranged in a regular wavelength grid of a certain wavelength spacing of typically 50 or 100 GHz. Typically, DPSK (differential phase-shift keying) or DQPSK (differential quadrature phase-shift keying) would be used to modulate a carrier on each wavelength channel. Not all of the waveband can be utilized for signal transmission, since in order to avoid signal overlap and crosstalk, a wavelength channel is separated in the frequency domain from a neighboring wavelength channel through a guard interval, which is in the range of 30% of the channel spacing.

Recently, a new modulation format known as orthogonal frequency division multiplexing (OFDM) has gained increased interest as candidate for future high-speed and high capacity optical transmission due to its high spectral efficiency and its resilience in the presence of fiber dispersion and polarization mode dispersion (PMD).

For OFDM transmission, a WDM wavelength channel is subdivided into equidistant sub-channels, which all together carry the information content of a data signal in a parallel fashion at a lower symbol rate.

An OFDM signal is typically generated by means of an inverse fast-Fourier transform: Parallel data streams, each data stream corresponding to one sub-channel, are mapped to parallel symbol streams using a specific modulation scheme (e.g., phase-shift keying—PSK, or quadrature amplitude modulation—QAM), and then fed to an IFFT-unit for performing an inverse fast Fourier-transform (IFFT). In the receiver, the process is reversed by feeding an FFT-unit performing a fast Fourier-transform (FFT).

SUMMARY OF THE INVENTION

It is an object of the present invention to improve optical transmission using OFDM. In particular, the embodiments described below achieve a higher spectral efficiency and allow in addition a narrow interleaving of OFDM sub-bands generated by locally distributed transmitters in a network without requiring the generation of frequency and phase locked optical carriers at the distributed transmitters.

These and other objects that appear below are achieved by transmitting optical signals using orthogonal frequency division multiplexing through an optical network, containing the following: A continuous waveband optical signal is generated from individual OFDM modulated optical signals. An optical add/drop multiplexer splits the continuous waveband optical signal into an express path and a drop path. A band pass filter is provided in the drop path to extract a sub-band carrying at least one of the OFDM modulated optical signals. The band pass filter has a filter bandwidth that covers the sub-band to be extracted. A band-stop filter is provided in the express path to remove the sub-band to be extracted from the continuous waveband optical signal. The band stop filter has a filter bandwidth which is narrower than the band pass filter.

An OFDM modulated optical add signal can be added into the wavelength gap created through the band stop filter. The sub-band carrying the optical add signal occupies a wavelength range which is completely covered by the filter bandwidth of the band-stop filter.

The difference between the filter bandwidth of the band pass filter and the filter bandwidth of the band stop filter corresponds preferably to the slope of the filter edges of the filters.

In order to compensate for the reduced spectral efficiency of the narrower bandwidth of the sub-band to be added, a higher constellation modulation format can be applied.

BRIEF DESCRIPTION OF THE DRAWINGS

Preferred embodiments of the present invention will now be described with reference to the accompanying drawings in which.

DETAILED DESCRIPTION OF THE INVENTION

The inventors propose to use instead of a fixed WDM channel spacing continuous waveband signals, which carry optical OFDM sub-bands, which represent a bit rate variable transmission format in a dynamic network. A flexible configuration of each OFDM sub-band allows to adapt for different optical signal paths, several OFDM sub-bands can be merged together to super channels, transporting a multiple capacity of an individual OFDM sub-band. The below embodiment describes a bit rate variable add- and drop function performed on a continuous waveband signal based on optical filtering and superposition of various OFDM sub-bands. The application of different modulation formats, e.g. 8-QAM or 16-QAM provides additional advantages.

The embodiment utilizes the finding that cross talk of adjacent OFDM bands has a negligible impact on the performance. Therefore, a continuous waveband signal based on OFDM can be used, which shows negligible guard intervals in the frequency domain between adjacent sub-bands.

Figure 1:
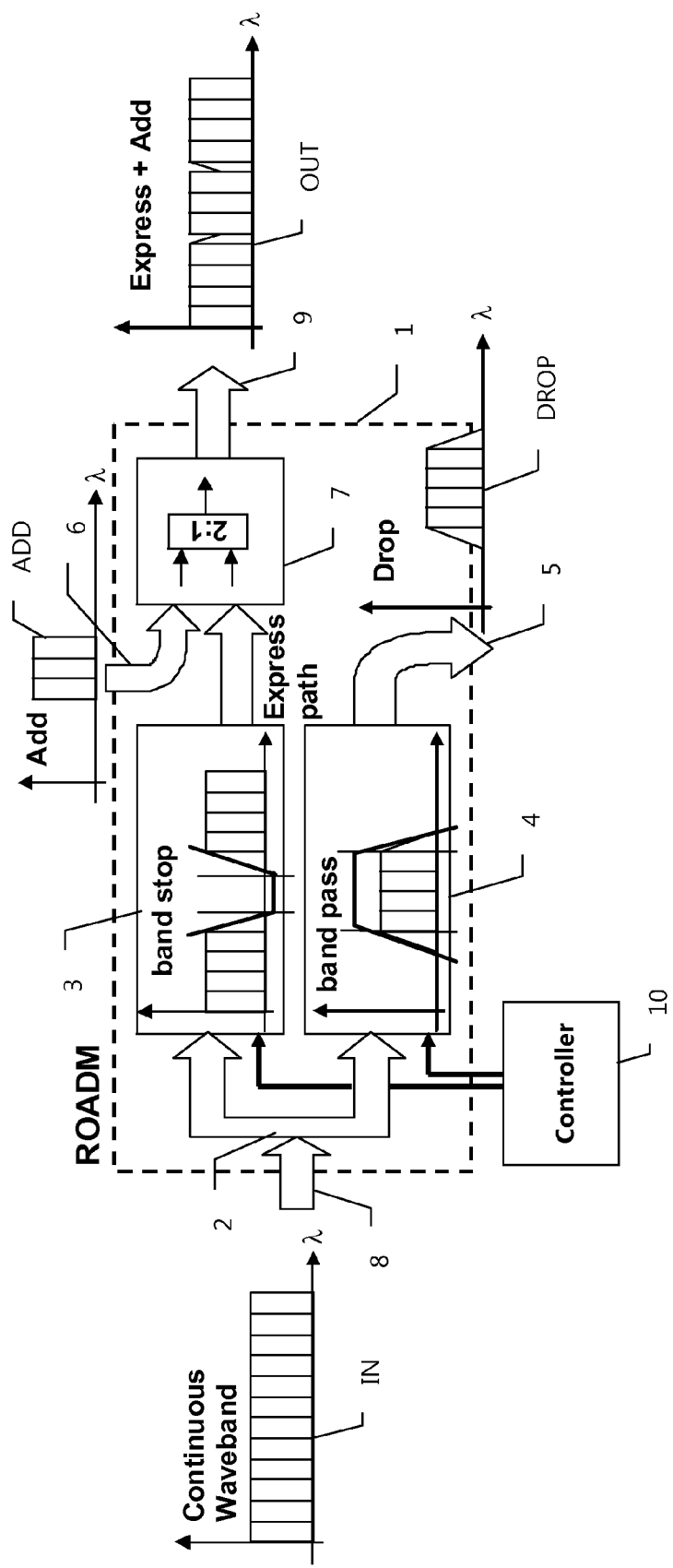
FIG. 1 shows a schematic block diagram of an add/drop multiplexer used for continuous waveband signals based on optical OFDM sub-bands

FIG. 1 shows a reconfigurable optical add-drop multiplexer (ROADM) 1 for continuous waveband signals. ROADM 1 has a signal input 8 for a received continuous waveband signal IN, a signal output 9 for an output continuous waveband signal OUT, a signal input 6 for a tributary signal ADD to be added, and a signal output 5 for a tributary signal DROP to be dropped.

Signal input 8 is connected to a splitter or branch element 2, which feeds to first and second filter elements 3, 4. The first filter element 3 is a band stop filter and the second filter element 4 is a band pass filter. Band pass filter connects to drop signal output 5 and band stop filter 3 connects to a 2:1 waveband multiplexer or optical coupler 7. A second input of multiplexer 7 is connected to add signal input 6 and the output of multiplexer 7 leads to signal output 9. A controller 10 may be used to configure the filters 3, 4, as will be explained in more detail below.

For the multiplexing and demultiplexing of continuous waveband signals, it has to be taken into account that optical filters have non-ideal filter edges with a finite slope. While for existing WDM applications, both band-stop and band-pass filters are typically inverse one to the other and filter edges are aligned to the relatively large guard-bands, the ROADM proposed here for continuous waveband schemes applies independent filter edges for band-stop and band-pass for optimized drop and optimized express pass. The express path is optimized for erasing the drop channel using band-stop filter 3 while the drop path uses band pass filter 4. Band stop filter 3 is set to minimize pass band attenuation such that filter edges are inside the drop channel band and band pass filter 4 is set to minimize the drop band attenuation such that filter edges are located inside the pass band.

Due to the finite filter slope, some residual signal of adjacent sub-bands beside the wanted or suppressed channels will remain as indicated in FIG. 1.

For the drop function, band pass filter 4 has a filter bandwidth, which is a little bit wider than the wanted sub-band to be dropped, thus leaving partly filtered adjacent sub-bands in the drop signal DROP. However, these residual adjacent signal components do not interfere with the wanted sub-band signal due to the square like shape of OFDM signals. Owing to the high selectivity of optical coherent receivers in the proposed system, no additional penalty has to be taken into account, when the adjacent sub-bands are not completely suppressed.

For the 'add' function, band stop filter 3 cleans up the spectrum, where the new OFDM sub-bands will be added. The filter bandwidth of band stop filter 3 is chosen smaller than the filter bandwidth of band pass filter 4, such that the adjacent sub-bands of the express path will not be corrupted. Hence, a transition area with some interfering signal power will remain, which cannot be removed at the receiver. To avoid high penalties because of linear cross talk, the bandwidth of the added channels will be smaller than the created spectral gap in the express path. This is achieved by allocating a lower bandwidth either by lower bit-rate signals or by increased spectral efficiency signals. Preferably, this loss of spectral efficiency may be compensated by the application of a higher constellation modulation format for the added tributary signal ADD.

Figure 2:
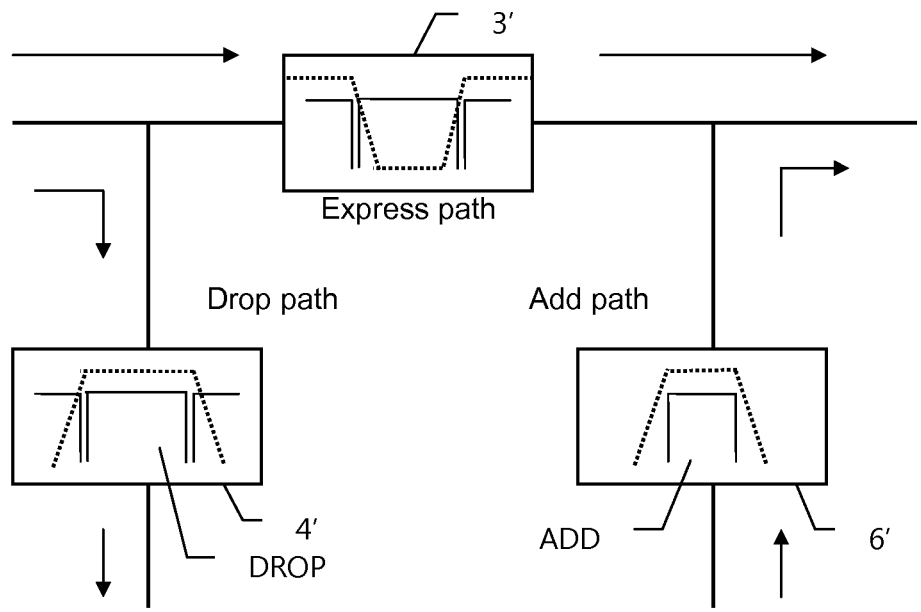
FIG. 2 shows in more detail the process of dropping and adding of sub-band signals.

This non-symmetrical filter set-up is shown in more detail in FIG. 2. In the drop path, band pass filter 4' has a filter bandwidth such that the desired drop signal DROP is completely covered. However, contributions from adjacent sub-bands from other tributary signals will also be included in the drop signal DROP, due to the slope of the filter edges. In the express path, band stop filter 3' has a bandwidth which is selected such that adjacent sub-bands are not affected, thus leaving residual signal portions from the dropped tributary will remain in the express signal. In the add path, a tributary signal ADD is added to the express signal, which occupies a wavelength sub-band with a smaller bandwidth as the dropped signal DROP such that it does not overlap the residual signal contributions from the dropped signal in the express path. An input filter function 6' can be provided in the add path, which preferably has the inverse filter function band stop filter 3'. This inverse filter function completely covers the add signal ADD.

Figure 3:
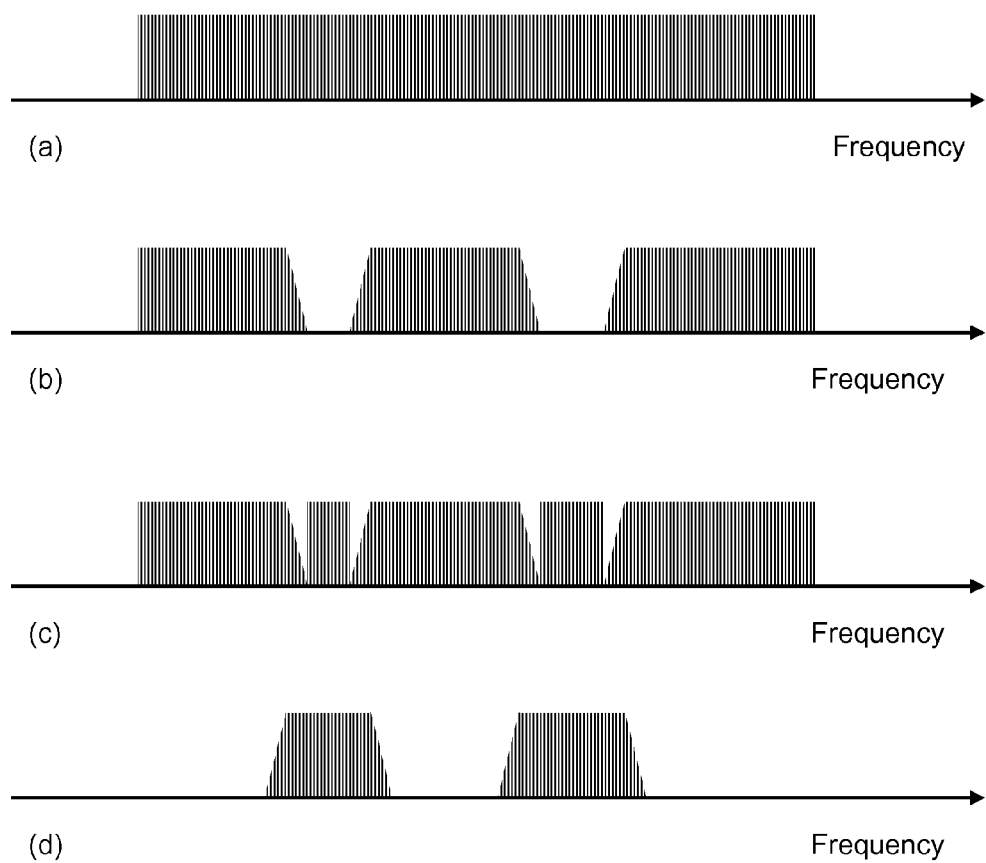
FIGS. 3a-d show schematically signal spectra at different points in the add/drop process.

By way of example, several signal spectra a shown in FIGS. 3a-3d. FIG. 3a shows a continuous waveband signal IN, which carries a number of adjacent OFDM sub-signals created at an edge node in the network. Due to the nearly rectangular nature of OFDM spectra, guard bands are negligible in this spectrum. FIG. 3b shows an express path spectrum, after two sub-bands of different bandwidth have been removed through corresponding band stop filters. FIG. 3c shows an output signal OUT after two new add signals have been added into the gaps created in FIG. 3b. FIG. 3d shows the spectra of the two dropped sub-band containing residual contributions from adjacent sub-bands due to broader filter configuration of the band pass filters in the drop path.

Figure 4:
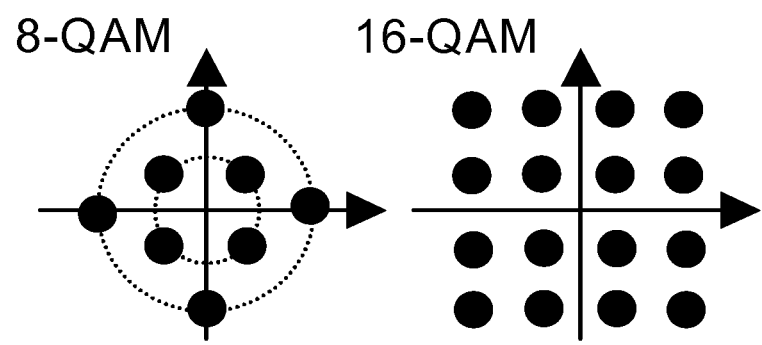
FIG. 4 shows a transmitter for an OFDM modulated optical signal.

The two sub-bands resided at the edges of each band stop filter cannot further be used for data transmission. This reduces the overall spectral efficiency of the setup. However, the data rate of the added OFDM channels can be increased by usage of a higher constellation modulation format, e.g. 16-QAM instead of 8-QAM as shown in FIG. 4, which allows to transmit 4 bits per symbol instead of 3 with 8-QAM.

The total transmission length, which can be passed in an optical network, without electrical regeneration, is limited anyway. Since at an add/drop point, the signal has already passed part of the maximum span length, the added signal will have a shorter distance to pass than the express signal. This allows to use a modulation format with a higher spectral efficiency. In the example, an added 16-QAM channel will achieves over a shorter distance the same Q-factor performance of about 10 dB as a reference configuration with 8-QAM. 16-QAM increases the net data rate of the added channels, thus preserving about the same capacity as the dropped sub-band.

It should be understood that the configuration shown in FIGS. 1 and 2 is exemplary and simplified to demonstrate the concepts of adding and dropping sub-band signals to and from a continuous waveband signal. In real network elements, a larger number of input and output signals can exist, several add and drop stages can be cascaded for each input signal, additional switch elements can interconnect add and drop paths of different input signals to achieve flexible traffic routing in a meshed network, additional components such as optical amplifiers, optical signal monitors, optical switches and the like can exist, and so on.

The shown arrangement of an ROADM allows very flexible allocation of sub-bands for tributary signals of variable bandwidth and rate. To fully support this property, a flexible configuration of band-pass and band-stop filters is preferable. Such freely configurable filters are available on the market, for example the WaveShaper series from Finisar, which is described in their whitepaper "Programmable narrow-band filtering using the WaveShaper 1000E and WaveShaper 4000E".

In FIG. 1, controller 10 serves to configure the filter characteristics of band-stop and band-pass filters 3, 4. Since the continuous waveband signal has no predefined, fixed wavelength grid, knowledge about the sub-band allocation in each individual case is required to properly set the filters. This information can be exchanged for instance through control plane signalling via GMPLS or can be configured through a central network management system.

Figure 5:
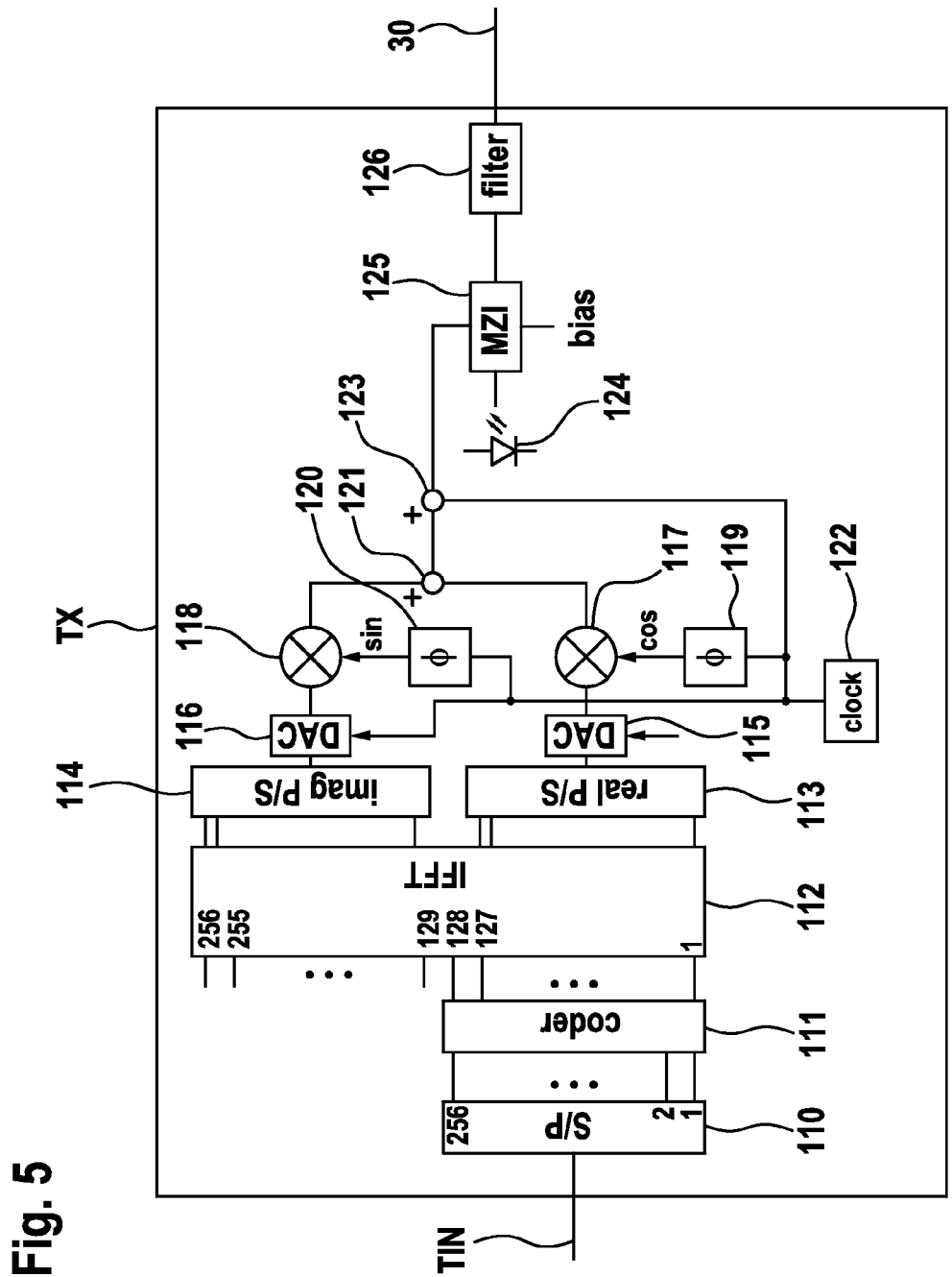
FIG. 5 shows an OFDM transmitter.

The individual sub-bands carry OFDM signals. OFDM transmitters and receivers are known per se and are described for example in EP2073474, which is incorporated by reference herein. An OFDM transmitter Tx is shown in FIG. 5.

Transmitter Tx generates from a data signal TIN an OFDM signal for transmission over an optical network Transmitter Tx contains a serial-to-parallel converter 110, a symbol coder 111, a digital signal processor 112 for performing inverse Fourier transformation; parallel-to-serial converter 113, 114 for the real and imaginary parts of the transformed signal, and an up-conversion stage including multipliers 117, 118 for multiplying the converted analog signal with a frequency signal. Multipliers are often also termed mixers.

The up-converted signals are added together in an added stage 121. In order to enable the receiver to lock onto the sampling frequency, the frequency signal from clock generator 122 is added in adder stage 123 to the OFDM signal and then sent to modulator 125, which modulated the cv signal of a transmit laser diode 124. Optionally, the modulated optical signal from the modulator 125 can be filtered by a filter device 126 and is then fed to the optical fiber link 30.

The operation of the OFDM transmitter Tx is as follows: The input data signal TIN is a data signal with very high bitrate such as 40 Gbit/s. It is converted to a parallel format in S/P converter 110. Since the above configuration allows flexible bandwidth assignment, the parallel format can have an adjustable width of N bits, e.g. 256 in the embodiment. The symbol coder reduces the number parallel bits by forming multi-level symbols. For example, a quaternary format with real and imaginary part can be used thus reducing the number of symbols to 128. Alternatively, higher level symbol format such as 16-QAM or 64-QAM signals could be generated, in which one symbol carries 4 or 6 bits, respectively.

The coded signals are input to the invers Fourier transform IFFT 112. The output of IFFT 112 is a time domain signal which has an imaginary and a real part. These two sub-signals are converted back to a serial format in P/S converters 115, 116 and subject to digital-to-analog conversion by digital-to-analog converters (DACs) 115, 116, respectively.

The DACs 115 and 116 are clocked at a transmit clock frequency, which corresponds to the input signal TIN rate.

The two analog output signals will then be combined for transmission. Since these are the real and imaginary parts of a complex signal, up-conversion at an auxiliary frequency is required. For this purpose, the same frequency signal can be used as for the D/A conversion, but with a phase difference of 90° between the imaginary and real part sub-signals. The frequency difference is set in phase shifters 119, 120, to which the auxiliary clock from clock generator 122 is fed. In the exemplary embodiment, two phase shifters are shown. It should be noted, however, that one of these could be omitted. The phase shifted auxiliary frequency signals and the corresponding real or imaginary part sub-signals are multiplied by the two electrical multipliers 117 and 118, respectively and added together in adder stage 121.

The up-converted, combined signal is then modulated in modulator 125, which is in the embodiment a Mach-Zehnder modulator, onto a cv laser signal from laser diode 124.

In the receiver, the reverse steps of analog-to-digital conversion and fast Fourier transform will be performed. Preferably, the receiver uses coherent detection with a tuneable laser as optical local oscillator.

Due its discrete nature, OFDM is very suitable for generating optical signals of configurable rate and bandwidth, which can be used with the ROADM of FIG. 1. An OFDM signal of higher bandwidth will have more OFDM sub-channels, while an OFDM signal of narrower bandwidth will occupy a lesser number of OFDM sub-channels. Moreover, by simply changing the coding format in the transmitter, signals of different spectral efficiency can be generated, depending for example on the transmission distance or the transmission quality, e.g. the Q-factor performance at the receiver.

What is claimed is:

1. A method of transmitting optical signals using orthogonal frequency division multiplexing through an optical network, comprising
receiving a continuous waveband optical signal that was generated from individual OFDM modulated optical signals,
at an optical add/drop multiplexer, splitting said continuous waveband optical signal into an express path and a drop path;
in the drop path, applying a band pass filter to extract a sub-band comprising at least one of said OFDM modulated optical signals, said band pass filter having a filter bandwidth wider than the sub-band to be extracted wherein the filter edges are outside the sub-band;
in the express path, applying a band-stop filter to remove said sub-band to be extracted from said continuous waveband optical signal, said band stop filter having a filter bandwidth which is narrower than said band pass filter wherein the filter edges are inside the sub-band.

2. A method according to claim 1, comprising adding to said express path a sub-band to be added carrying an OFDM modulated optical add signal, said sub-band to be added occupying a wavelength range which is completely covered by the filter bandwidth of said band-stop filter.

3. A method according to claim 2, comprising generating said OFDM modulated optical add signal using a higher constellation modulation format than the dropped OFDM optical modulated signal.

4. A method according to claim 1, comprising generating the OFDM modulated optical signals with configurable bandwidth and configuring said band pass and band stop filters in dependence of the configured signal bandwidth of the OFDM modulated optical signal to be dropped.

5. A method according to claim 4, comprising configuring the bandwidth of any of said OFDM modulated optical signals in dependence of the data rate of a client data signal to be transmitted and of a transmission distance to be reached.

6. A method according to claim 1, comprising at an optical receiver receiving said OFDM modulated optical signal to be dropped, performing coherent detection using a local oscillator and digital processing to retrieve a transmitted client data signal.

7. A method according to claim 1, wherein said individual OFDM modulated optical signals within said continuous waveband optical signal occupy adjacent sub-bands without substantial guard intervals in-between.

8. A method according to claim 1, wherein a difference between the filter bandwidth of said band pass filter and the filter bandwidth of said band stop filter corresponds to the slope of the filter edges of said filters.

9. An optical add/drop multiplexer for use in an optical network transmitting optical signals using orthogonal frequency division multiplexing comprising
a signal input for a continuous waveband optical signal generated from individual OFDM modulated optical signals;
a splitter splitting said continuous waveband optical signal into an express path and a drop path;
in the drop path, a band pass filter to extract a sub-band comprising at least one of said OFDM modulated optical signals, said band pass filter having a filter bandwidth wider than the sub-band to be extracted wherein the filter edges are outside the sub-band;
in the express path, a band-stop filter to remove said sub-band to be extracted from said continuous waveband optical signal, said band stop filter having a filter bandwidth which is narrower than said band pass filter wherein the filter edges are inside the sub-band.

10. An optical add drop multiplexer according to claim 9, comprising, an add signal input for an OFDM modulated optical add signal occupying a sub-band to be added, said sub-band to be added occupying a wavelength range which is completely covered by the filter bandwidth of said band-stop filter; and a multiplexer multiplexing said sub-band to the band stop filtered optical signal in the express path.

11. An optical add drop multiplexer according to claim 10, comprising at said add signal input a further band pass filter having a filter function that is inverse to the filter function of said band stop filter.

12. An optical add drop multiplexer according to claim 9, comprising a controller for configuring the filter bandwidths of said band pass and band stop filter.

* * * * *